US011512649B2

(12) United States Patent
Mistry

(10) Patent No.: US 11,512,649 B2
(45) Date of Patent: Nov. 29, 2022

(54) METHODS FOR CONTROLLING ACTUATING COMPONENTS OF TURBINE ENGINES USING AN ADAPTIVE DAMPING FILTER

(71) Applicant: General Electric Company, Schenectady, NY (US)

(72) Inventor: Manish Jagdish Mistry, Dallas, TX (US)

(73) Assignee: General Electric Company, Schenectady, NY (US)

( * ) Notice: Subject to any disclaimer, the term of this patent is extended or adjusted under 35 U.S.C. 154(b) by 708 days.

(21) Appl. No.: 15/913,113

(22) Filed: Mar. 6, 2018

(65) Prior Publication Data
US 2019/0277200 A1 Sep. 12, 2019

(51) Int. Cl.
*F02C 9/18* (2006.01)
*G05B 15/02* (2006.01)
*F02C 6/08* (2006.01)

(52) U.S. Cl.
CPC .............. *F02C 9/18* (2013.01); *F02C 6/08* (2013.01); *G05B 15/02* (2013.01); *F05D 2220/323* (2013.01); *F05D 2260/57* (2013.01); *F05D 2270/11* (2013.01); *F05D 2270/62* (2013.01)

(58) Field of Classification Search
None
See application file for complete search history.

(56) References Cited

U.S. PATENT DOCUMENTS

| 5,155,991 | A | 10/1992 | Bruun |
| 5,313,778 | A | 5/1994 | Sweet et al. |
| 6,231,306 | B1 | 5/2001 | Khalid |
| 6,463,730 | B1 | 10/2002 | Keller et al. |
| 6,481,210 | B1 | 11/2002 | Chapman |
| 6,921,244 | B2 | 7/2005 | Johnson |
| 7,647,778 | B2 | 1/2010 | Zewde et al. |
| 2015/0184552 | A1* | 7/2015 | Tobo et al. ........... F01K 23/101 |
| 2015/0275758 | A1 | 10/2015 | Foutch et al. |
| 2016/0040604 | A1 | 2/2016 | Hrach et al. |

OTHER PUBLICATIONS

Control Guru "Signal Filters and the PID with Controller Output Filter Algorithm" (Year: 2015).*
Wikipedia "Lookup Table" (Year: 2017).*
Wikipedia "Feature Scaling" (Year: 2017).*
Janabi-Sharifi "Discrete-Time Adaptive Windowing for Velocity Estimation" (Year: 2000).*
Su "A Model Reference-Based Adaptive PID Controller for Robot Motion Control of Not Explicitly Known Systems" (Year: 2007).*

* cited by examiner

*Primary Examiner* — Arun Goyal
*Assistant Examiner* — William L Breazeal
(74) *Attorney, Agent, or Firm* — Dority & Manning, P.A.

(57) ABSTRACT

Methods for controlling actuating components of turbine engines using an adaptive damping lag filter are provided. The adaptive filter includes features that filter out insignificant changes in actuator demand, respond to fast transient conditions to follow demanded position of the actuating component more closely, and adapts the gain of the output position to avoid stall conditions.

18 Claims, 6 Drawing Sheets

METHODS FOR CONTROLLING ACTUATING COMPONENTS OF TURBINE ENGINES USING AN ADAPTIVE DAMPING FILTER

FIELD

The present subject matter relates generally to turbine engines and particularly to methods for controlling actuating components of turbine engines.

BACKGROUND

A gas turbine engine generally includes, in serial flow order, a compressor section, a combustion section, a turbine section and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

When designing gas turbine engines, a common goal is to improve efficiency and enhance performance. In this regard, due to the varying operating conditions that exist during operation of a gas turbine engine, it is often desirable to design components that can be actuated or reconfigured to adapt to changing operating conditions within the engine, thereby increasing their associated operating efficiency/performance. However, in practice, the development of such components has proven difficult. As one example, Variable Bleed Valves (VBV) of gas turbine engines are typically controlled by VBV control logic to control stall margins of the engine. Currently, however, small changes to the scheduling inputs (e.g., fan speed) to the VBV control logic can cause significant change in valve demand, which often translates to undesirable actuator motion. This may cause excessive wear on the VBV actuation system, leading to shortened service lives of the valves.

Accordingly, improved systems and methods for controlling actuating components, such as VBVs, to accommodate changing operating conditions within a gas turbine engine would be useful.

BRIEF DESCRIPTION

Aspects and advantages of the invention will be set forth in part in the following description, or may be obvious from the description, or may be learned through practice of the invention.

In one aspect, the present disclosure is directed to a method for controlling an actuating component. The method includes obtaining a demanded position input of the actuating component for a current time step. The method also includes determining a rate of change of the demanded position input. Further, the method includes obtaining a delta, wherein the delta is representative of a demanded position output of a prior time step subtracted from the demanded position input for the current time step. In addition, the method includes determining a gain based at least in part on at least one of the rate of change of the demanded position input and the delta. Moreover, the method includes outputting a demanded position output for the current time step.

In some implementations, the actuating component may be a actuating component for a gas turbine engine and one or more controllers of the gas turbine engine are utilized to perform the exemplary method.

In another aspect, the present disclosure is directed to a turbine engine, such as e.g., a gas turbine engine or steam turbine engine. The turbine engine includes an actuating component and an actuator for actuating the actuating component. The turbine engine also includes a controller comprising an adaptive damping lag filter, the adaptive damping lag filter of the controller configured to: obtain a demanded position input of the actuating component for a current time step; determine a derivative of the demanded position input; obtain a delta, wherein the delta is representative of a demanded position output of a prior time step subtracted from the demanded position input for the current time step; determine a gain based at least in part on at least one of the derivative of the demanded position input and the delta; and output a demanded position output for the current time step to the actuator.

In a further aspect, the present disclosure is directed to a method for controlling an actuating component of a gas turbine engine. The method includes obtaining a demanded position input of the actuating component for a current time step. The method further includes determining a derivative of the demanded position input. Further, the method includes obtaining a delta, wherein the delta is representative of a demanded position output of a prior time step subtracted from the demanded position input for the current time step. In addition, the method includes determining a gain based at least in part on at least one of the derivative of the demanded position input and the delta, wherein the gain is selectable between at least three gains. Moreover, the method includes outputting a demanded position output for the current time step.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
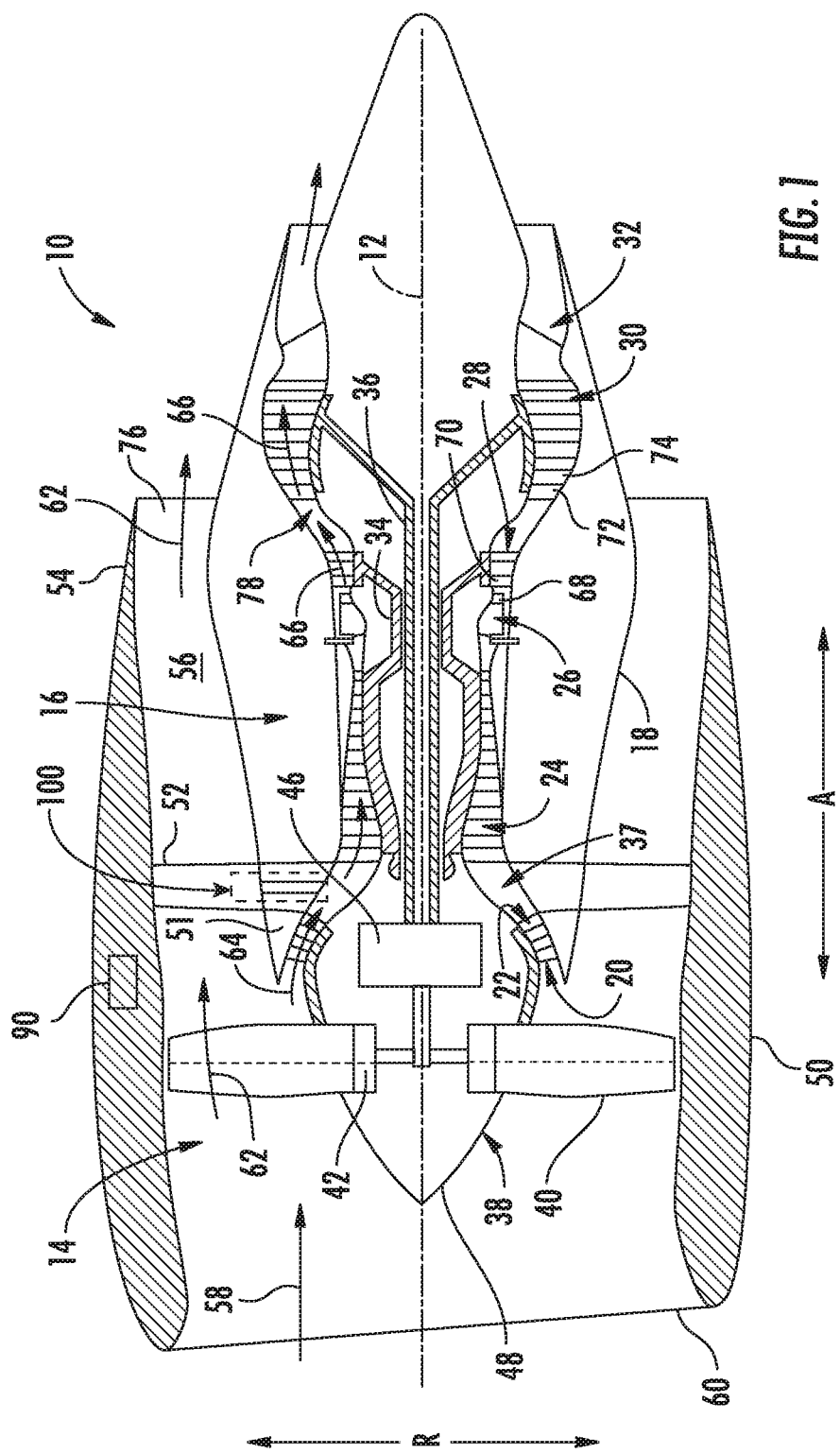
FIG. 1 provides a cross-sectional view of one embodiment of a gas turbine engine that may be utilized within an aircraft in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. Furthermore, as used herein, terms of approximation, such as "approximately," "substantially," or "about," refer to being within a ten percent (10%) margin of error.

In general, the present disclosure is directed to methods for controlling actuating components of turbine engines using an adaptive damping lag filter. Turbine engines that include such adaptive damping filters are also provided. The adaptive damping lag filter includes features that filter out insignificant changes in actuator demand, respond to fast transient conditions to follow demanded position of the actuating component more closely, and adapts the gain of the output position to avoid stall conditions. In particular, the gain is scheduled based at least in part on one or both of a position input demanded by the actuator to move the actuating component to the desired position and a delta between the current position demand and the position demand of the prior time step or iteration of the control logic of the adaptive filter. Using these inputs, the adaptive damping lag filter modifies the gain of the system to control the actuator to in turn optimally actuate the actuating component. In this way, the services lives of actuators and actuating components may be improved due to reduced wear from excessive actuation or oscillation of the actuator.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37. Additionally, a space between the casing 18 and the compressors 22, 24, a combustor of the combustion section 26, and the turbines 28, 30 may be referred to as an "under-cowl" area.

For the embodiment depicted, the fan section 14 includes a fixed-pitch fan 38 having a plurality of fan blades 40 coupled to a disk 42 in a spaced apart manner. As is depicted, the fan blades 40 extend outwardly from disk 42 generally along the radial direction R. The fan blades 40 and disk 42 are together rotatable about the longitudinal axis 12 by LP shaft 36 across a reduction gearbox/power gear box 46. The reduction gearbox 46 includes a plurality of gears for adjusting, or rather, for reducing, the rotational speed of the fan 38 relative to the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14 and passes across the fan blades 40. The volume of air 58 is then split at a flow splitter 51 into a first portion of air 62 that is directed or routed into the bypass airflow passage 56 and a second portion of air 64 is directed or routed into the core air flowpath 37, or more specifically into the booster or LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Further, for the depicted embodiment of FIG. 1, the exemplary turbofan engine 10 includes a bleed air assembly 100 that allows for a bleed valve 102 (FIGS. 2 and 3) to bleed off an amount of airflow from the core air flowpath 37 of the core turbine engine 16 (e.g., at a location downstream of the LP compressor 22 and upstream of the HP compressor 24) during operation of the turbofan engine 10. The bleed valve 102 may be a compressor bleed valve, for example. Bleed air from the core air flowpath 37 can be utilized for various uses, including e.g., cooling of the turbofan engine 10, starting another engine, anti-icing of the engine and airframe, pressurization of the cabin, etc. Moreover, stall margins of the engine can be controlled by actuating the bleed valve 102 to control the amount of bleed air from the core air flowpath 37.

In addition, as shown in FIG. 1, the turbofan engine 10 includes a controller 90 operatively configured to control various aspects of the turbofan engine 10, such as e.g., controlling one or more actuating components. Controller 90 can be, for example, an Electronic Engine Controller (EEC) or a Digital Engine Controller (DEC) equipped with Full Authority Digital Engine Control (FADEC). Controller 90 can include one or more processor(s) and one or more memory device(s). The one or more processor(s) can include any suitable processing device, such as a microprocessor, microcontroller, integrated circuit, logic device, and/or other suitable processing device. The one or more memory device(s) can include one or more computer-readable media, including, but not limited to, non-transitory computer-readable media, RAM, ROM, hard drives, flash drives, and/or other memory devices.

The one or more memory device(s) can store information accessible by the one or more processor(s), including computer-readable instructions that can be executed by the one or more processor(s). The instructions can be any set of instructions that when executed by the one or more processor(s), cause the one or more processor(s) to perform operations. In some embodiments, the instructions can be executed by the one or more processor(s) to cause the one or more processor(s) to perform operations, such as any of the operations and functions for which controller 90 is configured. The instructions can be software written in any suitable programming language or can be implemented in hardware. Additionally, and/or alternatively, the instructions can be executed in logically and/or virtually separate threads on processor(s). The memory device(s) can further store data that can be accessed by the one or more processor(s). For example, the data can include various thresholds that facilitate transitioning between gain states for actuating components, as will be described in greater detail herein. The data can be stored in one of the memory device(s) of controller 90, which can be downloaded or transmitted to other computing systems, such as e.g., an offboard computing system.

The controller 90 can also include a communication interface for communicating with the other components (e.g., actuating components or actuators configured to actuate such components) via a communication bus. The communication interface can include any suitable components for interfacing with one or more network(s), including e.g., transmitters, receivers, ports, controllers, antennas, and/or other suitable components.

The controller 90 may be communicatively coupled with a communication network. Communication network can include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the controller 90 to other computing systems. Such networking environments may use a wide variety of communication protocols.

It will be appreciated that the exemplary turbofan engine 10 depicted in FIG. 1 is by way of example only, and in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, an aeroderivative engine, industrial turbine engines, steam turbine engines, etc. In addition, in other exemplary embodiments, aspects of the present disclosure may be incorporated into non-turbine engine actuating systems.

Figure 2:
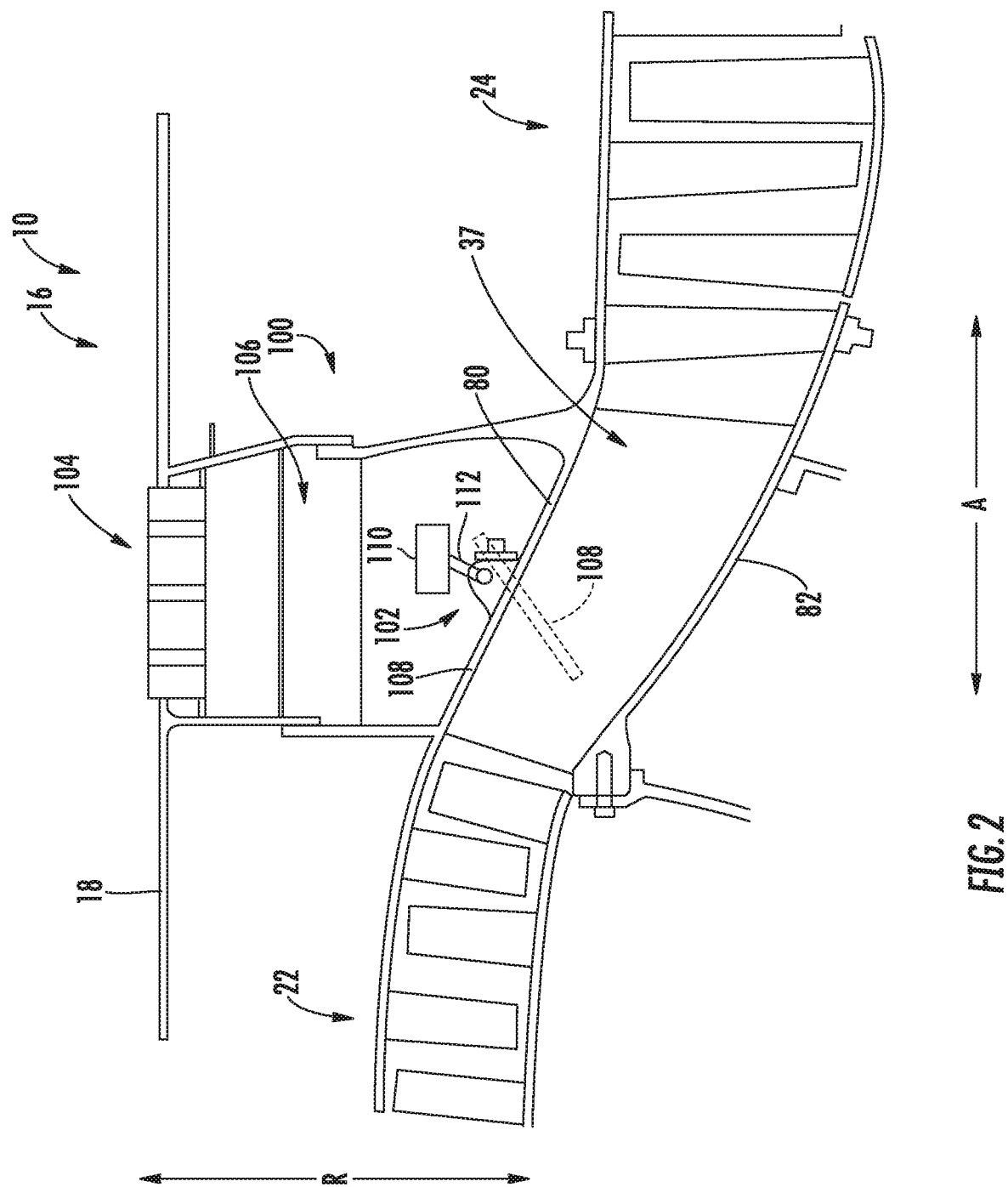
FIG. 2 is a schematic, cross-sectional view of a portion of a compressor section depicting a variable bleed valve actuation system of the exemplary gas turbine engine of FIG. 1.

FIG. 2 provides a cross-sectional view of the compressor section of the exemplary turbofan engine 10 of FIG. 1 depicting the bleed air assembly 100 in further detail. As depicted, the exemplary compressor section includes a first, LP compressor 22 and a second, HP compressor 24 located downstream of the LP compressor 22. The casing 18 of the core turbine engine 16 surrounds the LP compressor 22 and the HP compressor 24. Additionally, the core turbine engine 16 includes a flowpath liner extending forward from the LP compressor 22, between the LP compressor 22 and the HP compressor 24. Specifically, for the embodiment depicted, the core turbine engine 16 includes an outer flowpath liner 80 extending forward from the LP compressor 22, between the LP compressor 22 and the HP compressor 24, as well as an inner flowpath liner 82 located inward of the outer flowpath liner 80 along the radial direction R, and similarly extending between the LP compressor 22 and the HP compressor 24.

Moreover, as noted above, the exemplary turbofan engine 10 depicted includes bleed air assembly 100, which allows the core turbine engine 16 to bleed off an amount of airflow from the core air flowpath 37 (e.g., at a location downstream of the LP compressor 22 and upstream of the HP compressor 24) during operation of the turbofan engine 10. The exemplary bleed air assembly 100 includes an actuating component, which is bleed valve 102 in this exemplary embodiment. The bleed valve 102 is positioned in the outer flowpath liner 80 as shown. A duct 106 is in airflow communication with the bleed valve 102 and defines an outlet 104. The outlet 104 is positioned at the casing 18 (i.e., the outlet 104 is defined by the duct 106 immediately inside the casing 18, within the casing 18 (e.g., within an opening of the casing 18), or immediately outside the casing 18). As depicted, the bleed valve 102 includes a bleed valve door 108 that is movable between a closed position (depicted) and an open position (depicted in phantom). When in the open position, the bleed valve door 108 is configured to allow for an airflow (i.e., a flow bleed air) from the core air flowpath 37 at a location downstream of the LP compressor 22 to escape radially outward through the bleed valve 102 to the duct 106. An actuator 110 operatively coupled with the bleed valve 102 via an actuator arm 112 may actuate or modulate the bleed valve 102 in accordance with instructions provided by the controller 90 (FIG. 1). Although the bleed valve door 108 is shown in FIG. 2 opening into the core air flowpath 37, in alternative exemplary embodiments, the bleed valve door 108 may open away from the core air flowpath 37 into the duct 106.

Additionally, the duct 106 is configured to provide the flow bleed air from the bleed valve 102 through the outlet 104 when the bleed valve door 108 is in the open position. The outlet 104 of the duct 106 is positioned in airflow communication with the bypass passage 56 (FIG. 1) of the turbofan engine 10, for providing the bleed air to the bypass passage 56. By contrast, when the bleed valve door 108 is in the closed position, the bleed valve door 108 is substantially flush with the outer flowpath liner 80, and prevents a flow of compressed air from the core air flowpath 37 at a location downstream of the LP compressor 22 from escaping radially outward through the bleed valve 102.

Bleed valve 102 is provided as one example of an actuating component that may be controlled in accordance with the inventive aspects of the present disclosure. In some exemplary embodiments, actuating component may be another type of valve or actuating component. For example, in some exemplary embodiments, the actuating component may be one or more High Pressure Turbine Active Clearance Control (HPTACC) valves, Low Pressure Turbine Active Clearance Control (LPTACC) valves, Core Compartment Cooling (CCC) valves, Booster Anti-Ice (BAI) valves, Nacelle Anti-Ice (NAI) valves, Start Bleed Valves (SBV), Transient Bleed Valves (TBV), Modulated Turbine Cooling (MTC) valves and/or combined valves. Other examples of actuating components may include variable guide vanes, such as variable inlet guide vanes and variable outlet guide vanes, as well as other variable airfoil surfaces. Further, actuator 110 may be any suitable type of actuator capable of positioning (e.g., modulating) the actuating component. For instance, in some exemplary embodiments, actuator 110 may be a linear actuator or a rotary actuator. The angular position of the actuator (and consequently the actuating component) may be determined using a Variable Differential Transformer (VDT), resolver, or Hall Effect Sensor (HES), a combination thereof, or other suitable device or devices.

Figure 3:
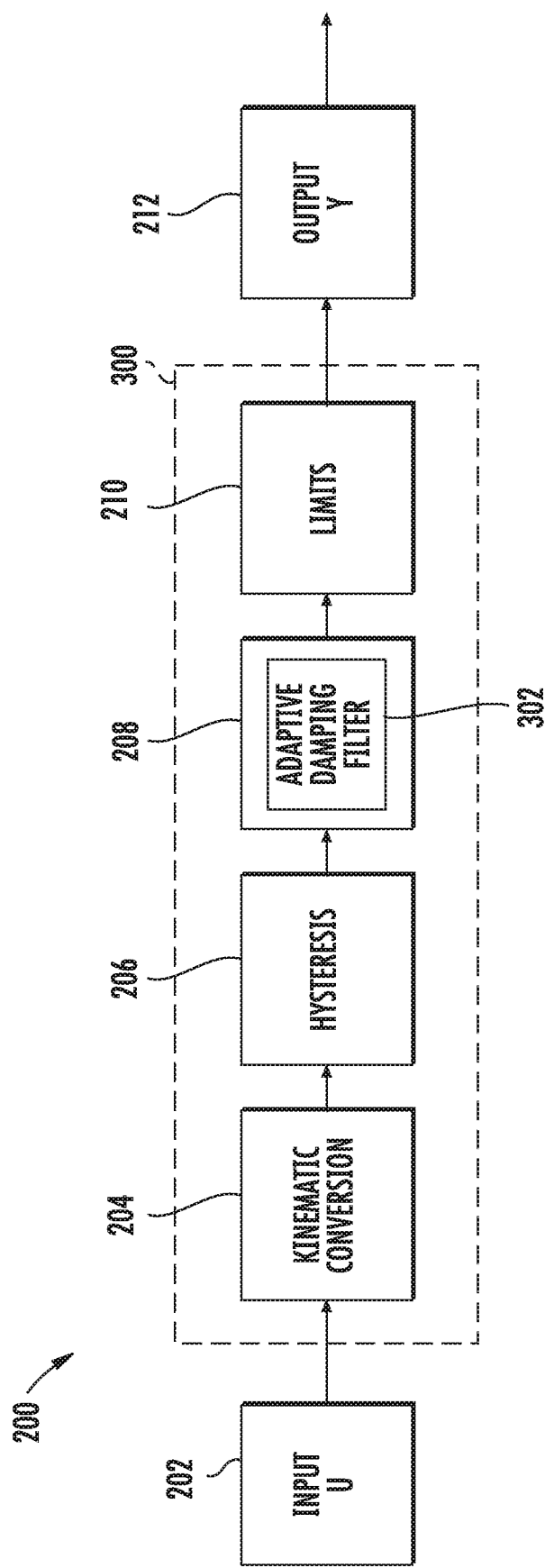
FIG. 3 provides a flow diagram for an exemplary process for controlling an actuating component of a turbine engine.

FIG. 3 provides a flow diagram for an exemplary method (200) for controlling an actuating component of a turbine engine. For this exemplary embodiment, the exemplary control logic of method (200) is provided for controlling the actuation of a bleed valve, such as the bleed valve 102 (FIG. 2) of the turbofan engine 10 of FIG. 1. Moreover, for this embodiment, the bleed valve 102 is a compressor bleed valve. For context, reference numerals utilized to describe turbofan engine 10 of FIG. 1 and the bleed air assembly 100 of FIG. 2 will be utilized below.

At block (202), a demanded position of the actuating component is obtained as an input to the control system, e.g., controller 90. That is, for this embodiment, a demanded position of the bleed valve 102 is obtained as an input. The demanded position input u can be obtained in any suitable units. For example, the demanded position input may be received or obtained as an area that the bleed valve 102 should be opened to or a desired flow rate through the bleed valve 102.

At block (204), the demanded position input u is forwarded to a kinematic conversion block, which is one of a number of control logic blocks of a demand filter 300. The kinematic conversion block converts the obtained demanded position input u into readily useable units, such as e.g., into a percent stroke (% stroke) of the actuator 110, or more particularly, the stroke of the actuator arm 112. For instance, a lookup table may be used to convert the demanded position input u into a % stroke that the actuator arm 112 needs to achieve in order to achieve the demanded position.

At block (206), the now converted demanded position input u is forwarded within the demand filter 300 to a hysteresis block. The hysteresis block compensates for any non-linearity in the inputs and prevents unwanted rapid actuation of the VBV. For instance, the hysteresis block can filter the incoming inputs so that the actuator 110 reacts less rapidly than it otherwise would to the given input, e.g., by taking recent history into account.

At block (208), the demanded position input u is forwarded to an adaptive damping lag filter 302 that outputs a demanded position output y. For instance, the output may be a percent stroke (% stroke) of the actuator arm 112 of the actuator 110. In accordance with exemplary aspects of the present disclosure, the adaptive damping filter 302 modifies the gain of the system such that the demand filter 300 may adaptively track fast rate changes in demand while filtering out small changes that cause undesirable movements. As will be explained further below, the gain is scheduled or modified according to demand dynamics. As a result of the adaptive gain, actuation systems or components controlled by such control logic may have improved service lives due to reduced wear from excessive actuation or oscillation of the actuating component. Adaptive damping filter 302 will be explained in further detail below.

At block (210), once the demanded position output y is outputted by the adaptive filter 302, the output is forwarded to a limit block. The limit block ensures that the outputted demanded position output y is not above or below predetermined limits. Like the output of block (208), the output of the limit logic block (210) may be a percent stroke (% stroke) of the actuator arm 112.

At block (212), the demanded position output y, which has been checked against predetermined limits at (210), is output from the demand filter 300. The output signal may be forwarded to the actuator 110, e.g., as a current or voltage, such that the actuator arm 112 adjusts its stroke in accordance with the output y. In this way, the bleed valve 102 may be actuated based on the demanded position.

Figure 4:
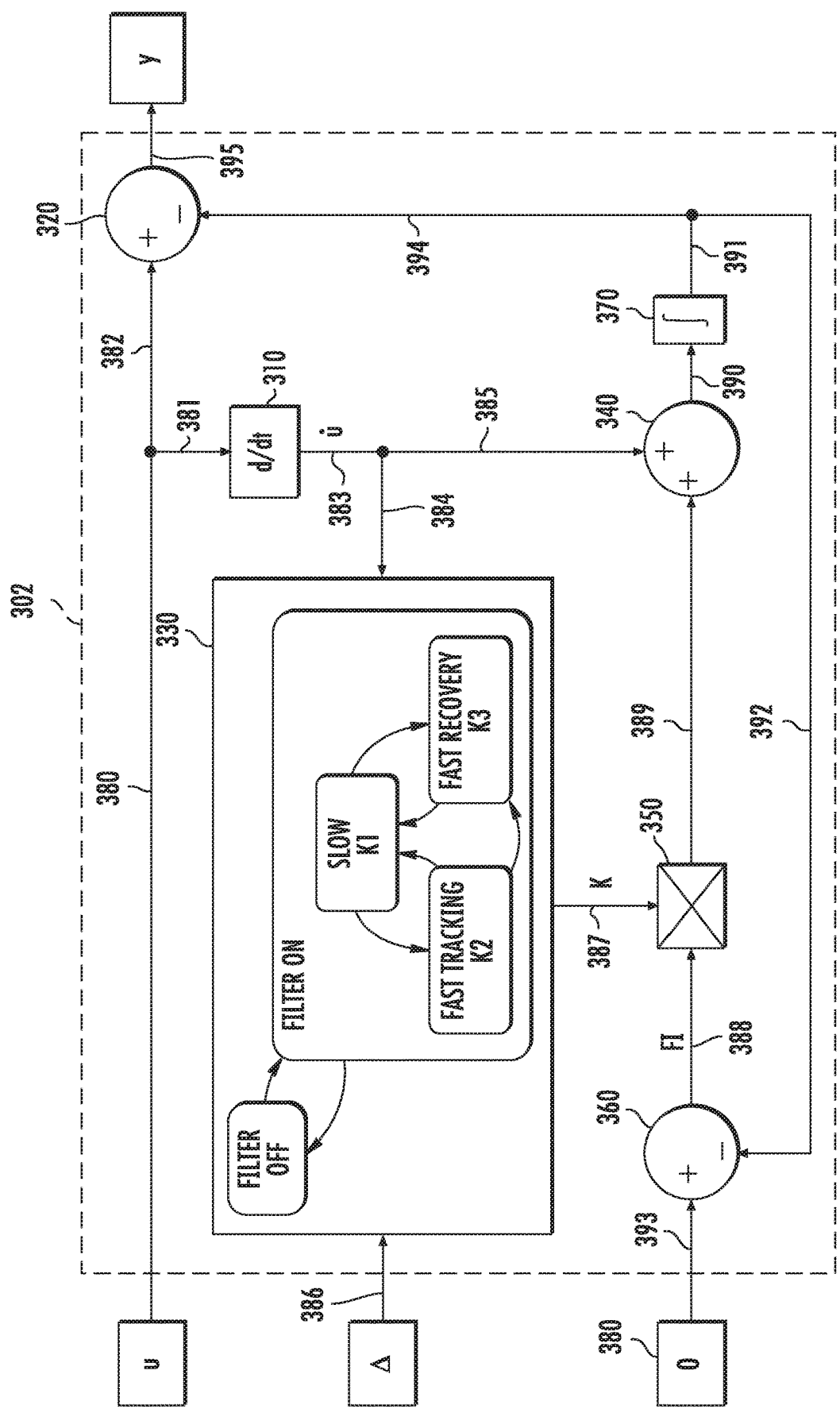
FIG. 4 provides a control logic diagram for an adaptive damping filter for controlling an actuating component of a turbine engine.

FIG. 4 provides a control logic diagram for the adaptive damping lag filter 302 of FIG. 3. As shown, the adaptive damping filter 302 obtains the demanded position input u. As noted above, the demanded position input u may be forwarded from the hysteresis block (206) as a percent stroke (% stroke) to the adaptive damping filter 302 at block (208) (FIG. 3). As depicted in FIG. 4, the demanded position input u is input into the adaptive damping filter 302 at line 380. The demanded position input u proceeds to a derivate block 310 at line 381 and to a summing junction 320 at line 382. The demanded position input u that proceeds along line 381 is input into the derivate block 310. The derivative block 310 calculates or determines the derivative of the demanded position input u, yielding the rate of change of the demanded position input u̇ (i.e., the derivative of the demanded position input u). The rate of change of the demanded position input u̇ is output from the derivative block 310 at line 383.

From line 383, the rate of change of the demanded position input u̇ (i.e., the derivative of the demanded position input u) proceeds to an adaptive gain block 330 at line 384 and to a summing junction 340 at line 385. Particularly, at line 384, the rate of change of the demanded position input u̇ is input into the adaptive gain block 330. At line 386, a delta Δ is likewise input into the adaptive gain block 330. The delta Δ is representative of the demanded position output y of a prior time step $k^{-1}$ subtracted from the demanded position input u for the current time step k. Stated differently, the control logic is executed during a given time step k to output a demanded position output y. During the prior time step $k^{-1}$ or iteration in which the control logic is executed, a demanded position output y is output from the system. Thus, to calculate delta Δ for the current time step k, the demanded position output y of the prior time step $k^{-1}$ is subtracted from the demanded position input u for the current time step k.

Once the rate of change of the demanded position input u̇ and the delta Δ are input into the adaptive gain block 330 of the adaptive damping filter 302, a gain K is determined based at least in part on one of the rate of change of the demanded position u̇ and the delta Δ (i.e., the inputs), and then the gain K is fed forward through adaptive damping filter 302 such that the demanded position output y for the current time step k is output from the filter 302.

As noted above, in accordance with exemplary aspects of the present disclosure, based at least in part on the rate of change of the demanded position u̇ and the delta Δ, the gain K may be modified or adapted. In particular, based on the inputs forwarded to the adaptive gain block 330, the gain K may be modified or adapted such that the filter is switchable between a "Filter On" and "Filter Off" position, as well as between different gain states. For instance, in the depicted embodiment of FIG. 4, the gains or gain states include a slow gain K1, a tracking gain K2, and a recovery gain K3. For this exemplary embodiment, depending on the inputs received, the gain K is modified to be one of the gains noted above, or if certain criteria is met, the adaptive damping filter 302 may be switched to a "Filter Off" state. In this way, the gain K is selectable between at least three gains. In the "Filter Off" state, the demanded position output y is equal to the demanded position input u. In some exemplary embodiments, the gain K is selectable between at least two gains. In some exemplary embodiments, the gain K is selectable between more than three gains.

Figure 5:
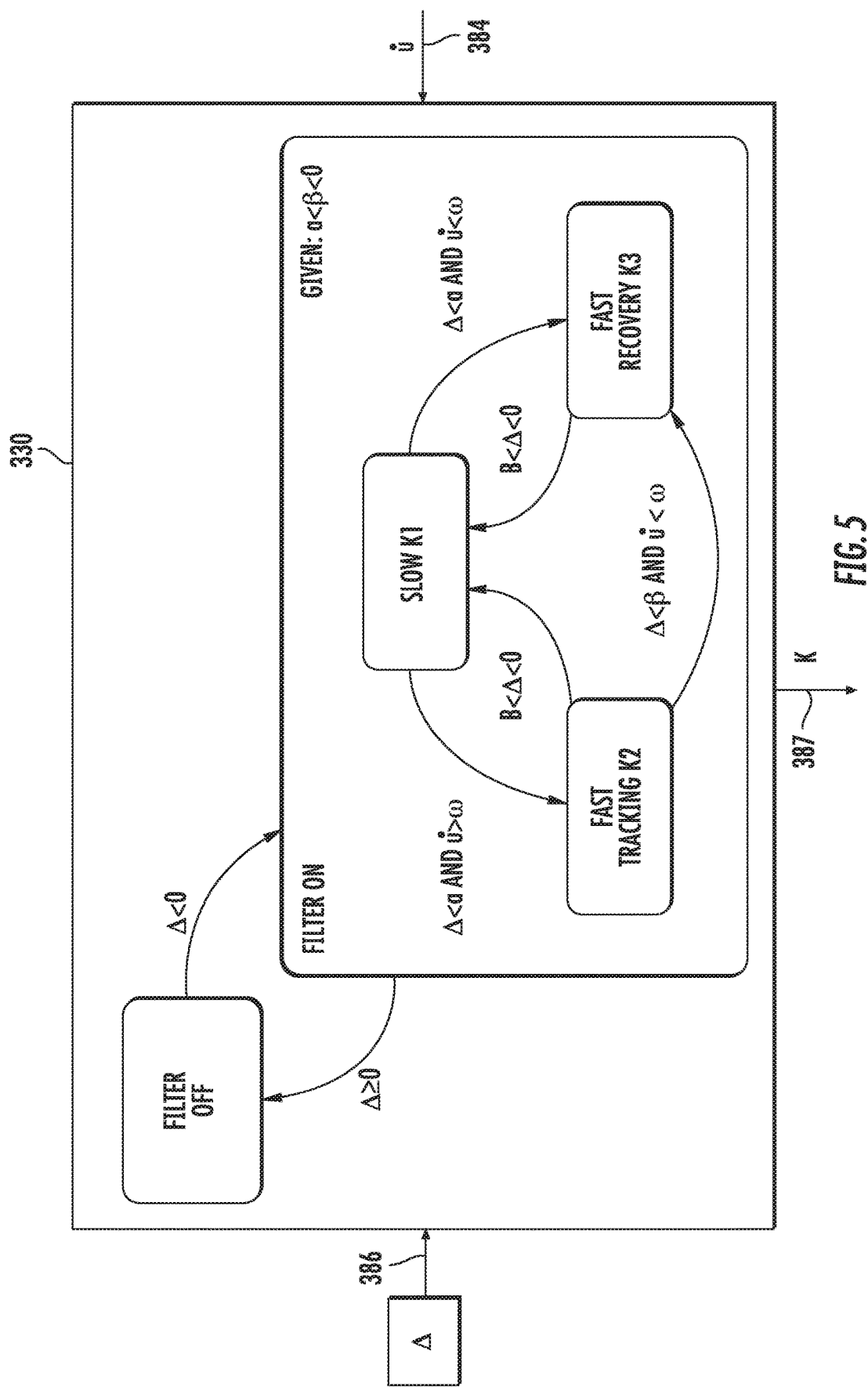
FIG. 5 provides a close-up view of an adaptive gain block of the adaptive damping filter of FIG. 4 depicting the internal control logic thereof.

FIG. 5 provides a close-up view of the adaptive gain block 330 of FIG. 4 depicting the internal control logic thereof. The adaptive gain block 330 is set to an initial gain state, which may be any suitable state. For example, the initial gain or initial gain state can be set to "Filter Off" or to a "Filter On" state and to a slow gain state K1. Alternatively, the initial gain state may be a "Filter On" state and to a tracking state K2 or to the recovery state K3. As the inputs are fed into adaptive gain block 330, the gain state will remain active or in the same state unless certain transition criteria is met.

As shown in FIG. 5, exemplary logic for transitioning between gain states is provided. For the purposes of explanation, suppose the initial gain state is a "Filter Off" state. When the rate of change of the demanded position input u̇ and the delta Δ are received by the adaptive gain block 330, the control logic determines or calculates whether delta Δ is less than zero (0), or if Δ<0. If delta Δ is greater than zero (0), than the filter 302 remains off. In this exemplary embodiment, the "Filter Off" state corresponds to a demand by the actuator 110 to open the door 108 of the bleed valve 102. As opening the bleed valve 102 may be critical to remaining within certain operating stall margins, it is important to actuate the bleed valve 102 to the demanded open position as quickly as possible. Opening the bleed valve 102 to the demanded position can be achieved by turning off or keeping the adaptive damping lag filter 302 in the "Filter Off" state so that the demanded position output y is equal to or about equal to the demanded position input u (within limits of the system). This may be achieved by not modifying or adapting the gain K of the system; and accordingly, the adaptive damping lag filter is set to off or the control logic maintain the filter in the off state.

On the other hand, if delta Δ is less than zero (0), then the control logic transitions the filter 302 from a "Filter Off" state to a "Filter On" state. In this way, the gain K may be modified or adapted to the present or current conditions of the engine such that the actuator 110 may actuate the bleed valve 102 to a more closed or fully closed position in way that is optimal for the service life of the bleed valve 102 and actuator, among other benefits. In alternative embodiments, where the initial state is a "Filter On" state, the control logic determines or calculates whether delta Δ is greater than or equal to zero (0), or if Δ≥0. If delta Δ is greater than or equal to zero (0), than the filter 302 transitions to a "Filter Off" state. If, however, delta Δ is not greater than or equal to zero (0), then the control logic remains in the "Filter On" state, and more particularly, in the "Filter On" state in one of the gain states, e.g., slow gain K1, tracking gain state K2, recovery gain state K3, or some other gain state in the "Filter On" state.

Supposing now that delta Δ is less than zero (0), or that Δ<0 is true, the adaptive damping lag filter 302 is switched to a "Filter On" state. Within the "Filter On" state, as noted above, for this exemplary embodiment there are three gain states, the slow gain K1, the tracking gain state K2, and the recovery gain state K3. The control logic may default to one of the gain states, such as e.g., the slow gain state K1. For this exemplary embodiment, suppose the default gain state when switching from the "Filter Off" state to the "Filter On" state is the slow gain state K1. If none of the control logic transition criteria are met, the gain K output from the adaptive gain block 330 is a slow gain K1 and the slow gain K1 proceeds through the remaining logic of adaptive damping lag filter 302.

However, if certain control logic transition criteria is met, the gain state may transition from the slow gain state K1 to either the tracking gain state K2 or the fast recovery gain state K3. For instance, if the control logic determines that delta Δ is less than an alpha threshold α AND the rate of change of the demanded position input u̇ is greater than a threshold for the rate of change of the demanded position input, denoted as ω, or if Δ<α AND u̇>ω, then the control logic transitions the gain state from the slow gain state K1 to the fast tracking gain state K2. The alpha threshold α is a predetermined threshold for the delta Δ and is less than zero (0) in this embodiment; that is, α<0. The threshold for the rate of change of the demanded position input ω is a threshold that is provided to assist the control logic in determining whether the rate of change of the demanded position input u̇ input into the adaptive gain block 330 is greater than or equal to a certain rate threshold, or 107. As shown in FIG. 5, if the rate of change of the demanded position input u̇ is greater than the threshold for the rate of change of the demanded position input ω (and Δ<α), then the the gain state transitions from the slow gain state K1 to the tracking gain state K2. On the other hand, if the rate of change of the demanded position input u̇ is less than the threshold for the rate of change of the demanded position input ω (and Δ<α), then the gain state transitions from the slow gain state K1 to the fast recovery gain state K3.

With reference still to FIG. 5, assuming now that the initial gain state or gain state of the prior time step $k^{-1}$ was set or determined to be the fast tracking gain state K2 and that delta Δ is less than zero (0), or Δ<0 and if none of the transition criteria are true, then the gain state for the current time step k is determined to be fast tracking gain state K2 and the same is output from the adaptive gain block 330 and forwarded through the remaining logic of the adaptive damping lag filter 302.

If, however, the control logic determines that a beta threshold β is less than delta Δ (and that delta Δ is less than zero (0)), then the control logic transitions the gain state from the fast tracking gain state K2 to the slow gain state K1. The beta threshold β is a predetermined threshold for delta Δ and is less than zero (0) in this embodiment; that is: β<0. Further, for this exemplary embodiment, the beta threshold β is greater than the alpha threshold α, that is: α<β<0. As bleed valve door 108 is being closed by actuator 110, the demanded area or flow through bleed valve 102 decreases, as such the position demand u also becomes smaller and smaller as the bleed valve door 108 is closed. Accordingly, delta Δ becomes greater and greater as time increases during a closing operation of bleed valve door 108. To prevent bleed valve door 108 from slamming or aggressively closing, the gain state is modified or adapted to transition from the fast tracking gain state K2 to the slow gain state K1 to ultimately slow the rate of closure of bleed door 108.

In addition, if the control logic determines that delta Δ is less than the beta threshold β AND the rate of change of the demanded position input u̇ is less than the threshold for the rate of change of the demanded position input ω, or if: Δ<β AND u̇<ω, then the control logic transitions the gain state from the fast tracking gain state K2 to the fast recovery gain state K3. In transitioning from the fast tracking gain state K2 to the fast recovery gain state K3, the control logic determines that the rate of the rate of change of the demanded position input u̇ is less than the threshold ω, and accordingly, it is determined that by switching gain states that a more expedient way of closing the bleed valve 102 is available.

Referring still to FIG. 5, assuming now that the initial gain state or gain state of the prior time step k⁻¹ was set or determined to be the fast recovery gain state K3 and that delta Δ is less than zero (0), or Δ<0. If none of the transition criteria are true, then the gain state for the current time step k is determined to be fast recovery gain state K3 and the same is output from the adaptive gain block 330 and forwarded through the remaining logic of the adaptive damping lag filter 302. If, however, the control logic determines that the beta threshold β is less than delta Δ (and that delta Δ is less than zero (0)), then the control logic transitions the gain state from the recovery gain state K3 to the slow gain state K1 for reasons explained above with respect to when the control logic transitions the gain state from the fast tracking gain state K2 to the slow gain state K1. Once the control logic transitions the gain state from the fast recovery gain state K3 to the slow gain state K1, the gain state for the current time step k may be selected as the slow gain state K1, and accordingly, the control logic outputs the slow gain K1 from the adaptive gain block 330. However, once the control logic transitions to the slow gain state K1 and the transition criteria is met to transition the gain state from the slow gain state K1 to the fast tracking gain state K2, the control logic selects the fast tracking gain state K2 and outputs the fast tracking gain K2 from the adaptive gain block 330 accordingly.

Referring again to FIG. 4, as shown, the modified or adapted gain K is output from adaptive gain block 330 at line 387. The gain K, as noted above, may be K1, K2, K3 or a nominal K value in the event the gain state is transitioned or set to a "Filter Off" state. It will be appreciated that in other exemplary embodiments there may be more or less than the exemplary states described above. At line 387, the gain K is input into a multiplication block 350. At multiplication block 350, the gain K is multiplied with a feedback input FI that is forwarded to multiplication block 350 along line 388 after being calculated at summing junction 360.

After the gain K is multiplied with the feedback input FI at multiplication block 350, the product of that operation is forwarded at line 389 to the summing junction 340. The summing junction 340 adds the product of multiplication block 350 and the rate of change of the demanded position input it that is forwarded to summing junction 340 at line 385. The sum of the summing junction 340 is forwarded to an integrator 370 at line 390. Integrator 370 outputs the time integral of its input, which is the sum of the product of multiplication block 350 and the rate of change of the demanded position input u̇ for this embodiment. The output of the integrator 370 is output from integrator 370 at line 391. Thereafter, the output of the integrator 370 is forwarded to the summing junction 360 along a feedback loop at line 392. At summing junction 360, the output of the integrator 370 becomes a negative value at summing junction 360, as it is added to a zero (0) value input 380 input into the summing junction 360 at line 393 such that the sum becomes the feedback input FI. As described above, the feedback input FI is forwarded along line 388 to multiplication block 350 where it is multiplied with the outputted gain K.

Further, the output of the integrator 370 is forwarded to summing junction 320 at line 394. At summing junction 320, the output of the integrator 370 is provided with a negative value and is added to the demanded position input u that is forwarded to summing junction 320 at line 382. The sum of the summing junction 320 is output from summing junction 320 at line 395 as the demanded position output y. Then, as shown in FIG. 3, the demanded position output y may forwarded from the adaptive damping lag filter 302 at block (208) to the limit block (210), and ultimately, the demanded position output y is output from the demand filter 300 and is forwarded to the actuator 110 such that the stroke of the actuator arm 112 is adjusted in accordance with the demanded position output y that was determined based at least in part on one or both of the rate of change of the demanded position u̇ and the delta Δ.

Further, in some exemplary embodiments, instead of having defined gain states, e.g., slow gain state K1, fast tracking gain state K2, and fast recovery gain state K3, the gain K may be adapted by: obtaining the rate of change of the demanded position u̇ and the delta Δ for a given time step k, and then determining the gain by looking up a gain value K that corresponds with the given input values, e.g., in a lookup table. Thereafter, the gain K output from the adaptive gain block 330 may be forwarded through the remaining control logic of the adaptive damping lag filter 302 so that the system may output the demanded position output y.

It will be appreciated that in some exemplary embodiments that the adaptive damping lag filter 302 may have other suitable control logic configurations and may include additional or fewer control processes or elements. Further, it will be appreciated that in some exemplary embodiments that the demand filter may include additional or fewer processes.

Figure 6:
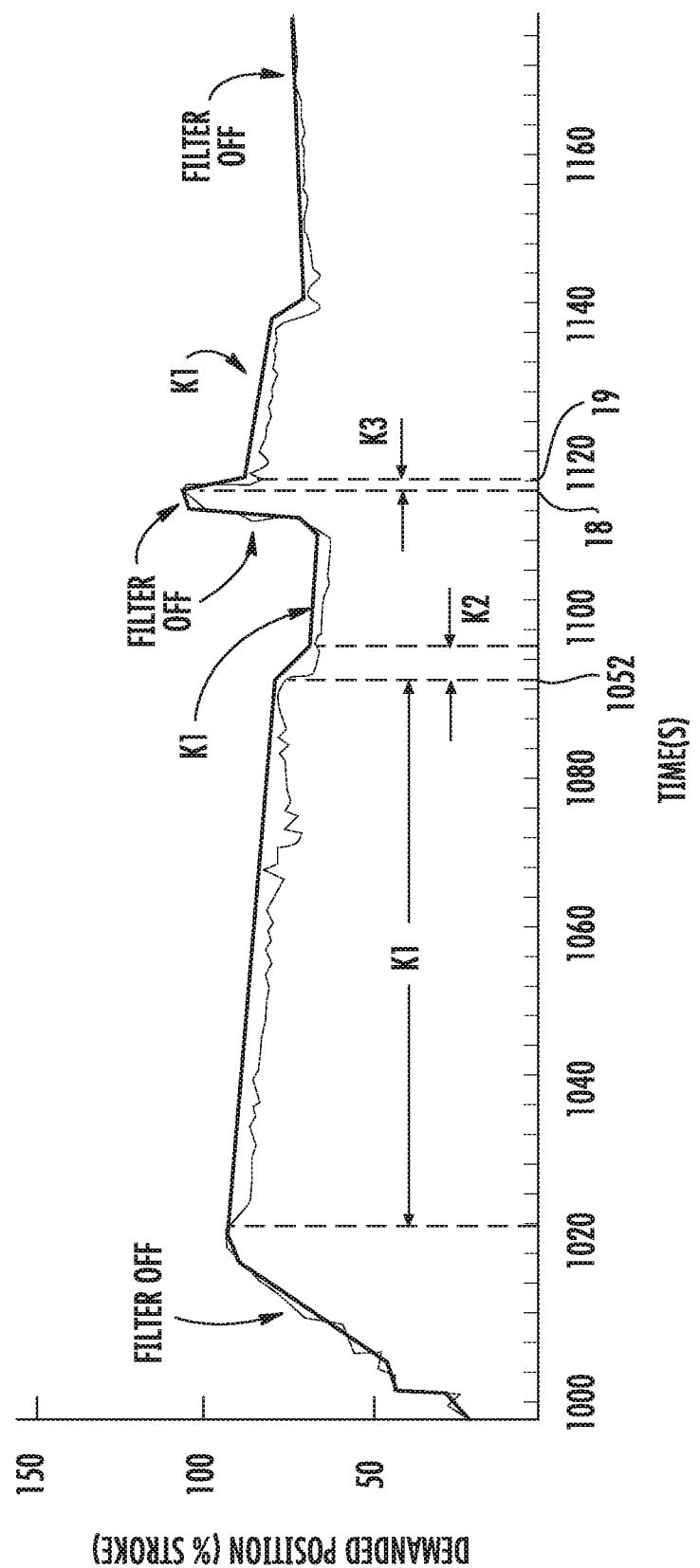
FIG. 6 provides a chart depicting various examples of when exemplary gains or gain states may be used to control an actuator operatively coupled with an actuating component.

FIG. 6 provides a chart depicting various examples of when the exemplary gains or gain states noted above may be used to control an actuator operatively coupled with an actuating component. Reference numerals from FIGS. 1 through 5 may be used for context. As shown in the chart of FIG. 6, the demanded position (% stroke) of the actuator is shown as a function of time (seconds).

At time (t) 1000 to about 1024 seconds, the demanded position is shown increasing. This corresponds to the actuating component demanding actuation to a more open position, and consequently, the actuator demands a higher percentage of its total stroke. As one example, suppose the actuating component is a compressor bleed valve, such as e.g., the bleed valve 102 of FIG. 2. When the bleed valve 102 demands actuation to a more open position, it may be undesirable to modify the gain K as it may be important to open the valve as fast as possible, e.g., to avoid stall conditions. As such, from time (t) is equal to 1000 to about 1024 seconds, the adaptive damping lag filter 302 may be transitioned or set to a "Filter Off" state. In this way, the valve door 108 has an instant response to the demanded stroke position.

At time (t) 1024 to about 1097 seconds, the demanded position is shown decreasing, and particularly, decreasing steadily. This corresponds to the actuating component demanding actuation to a more closed position, and consequently, the actuator demands a lower percentage of its total stroke. As the actuator is demanding less percent stroke, the adaptive damping lag filter 302 may remain or transition to a "Filter On" state. Moreover, in this time frame, as delta $\Delta$ is greater than the beta threshold $\beta$ and none of the other transition criteria are true, the selected gain is the slow gain K1. Accordingly, the gain K is modified as K1 and the gain is used to create a lag in the system that creates a steady closing of the valve. As shown, the insignificant changes in the valve position demand are smoothed out by modified gain K1.

At time (t) 1097 to about 1102 seconds, the demanded position is shown decreasing, and particularly, decreasing more rapidly than from time (t) 1024 to about 1097 seconds. From 1097 to about 1102 seconds, the demanded stroke decreases by about ten percent (10%). This corresponds to the actuating component demanding actuation to a more closed position more rapidly or quicker than from 1024 to about 1097 seconds. As the actuator is demanding less percent stroke at a faster rate, the adaptive damping lag filter 302 may remain or transition to a "Filter On" state, and for the noted time frame, as $\Delta<\alpha$ AND $\dot{u}>\omega$ is true, the selected gain is the fast tracking gain K2. Accordingly, the gain K is modified as K2 and the gain is used to create a lag in the system that creates a steady but more rapid closing of the valve. As shown, by modifying the gain to the fast tracking gain K2, the valve is able to close more quickly in response to the fast transient demand.

At time (t) 1122 to about 1124 seconds, after a period in which the valve was demanded more open, the demanded position is shown decreasing, and particularly, decreasing more rapidly than from time (t) 1097 to about 1102 seconds. At the time (t) 1122 to about 1124 seconds time frame, the controller 90 recognizes that the current position of the valve is causing air to bleed from the core air flowpath 37 at such a rate that the turbofan engine 10 may exceed a stall margin, and thus, the turbofan engine 10 may stall if immediate corrective action is not taken. Accordingly, the actuator demands less percent stroke at a very fast rate, and the adaptive damping lag filter 302 may transition to a "Filter On" state, and for the noted time frame, the adaptive damping lag filter 302 may select the gain as the fast recovery gain K3 if one or more of the transition criteria set forth in FIG. 5 are met. Accordingly, the gain K is modified as K3 and the gain is used to create a lag in the system that creates a rapid recovery of the valve toward the closed position. As shown, by modifying the gain to the fast recovery gain K3, the valve is move to a more closed or closed position rapidly, e.g., e.g., to prevent stall conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an actuating component of a gas turbine engine, the method comprising:
   obtaining a demanded position input of the actuating component for a current time step;
   determining a rate of change of the demanded position input;
   obtaining a delta, wherein the delta is representative of a demanded position output of a prior time step subtracted from the demanded position input for the current time step;
   determining a gain based at least in part on a size or a sign of the delta, wherein the gain is determined as one of a plurality of gains that include a slow gain, a fast tracking gain, and a fast recovery gain for avoiding stall conditions associated with the gas turbine engine; and
   outputting a demanded position output for the current time step based at least part on the gain.

2. The method of claim 1, wherein the actuating component is a valve for the gas turbine engine.

3. The method of claim 1, wherein the method further comprises:
   determining whether the delta is greater than or equal to zero;
   wherein if the delta is greater than or equal to zero (0), the demanded position output for the current time step is outputted as a value that is equal to the demanded position input.

4. The method of claim 1, wherein the gain is determined to be the slow gain for the current time step if: $\beta<\Delta<0$; wherein $\Delta$ is the delta and $\beta$ is a beta threshold for the delta.

5. The method of claim 4, wherein the gain transitions from the slow gain to the fast tracking gain for the current time step if: $\Delta<\alpha$ AND $\dot{u}>\omega$; wherein $\Delta$ is the delta, $\alpha$ is an alpha threshold for the delta, $\dot{u}$ is the rate of change of the demanded position input, and $\omega$ is a threshold for the rate of change of the demanded position input, and wherein $\alpha<\beta<0$.

6. The method of claim 4, wherein the gain transistions from the slow gain to the fast recovery gain for the current step if: $\Delta<\alpha$ AND $\dot{u}<\omega$; wherein $\Delta$ is the delta, $\alpha$ is an alpha threshold for the delta, $\dot{u}$ is the rate of change of the demanded position input, and $\omega$ is a threshold for the rate of change of the demanded position input, and wherein $\alpha<\beta<0$.

7. The method of claim 1, wherein if the gain was determined to be the fast tracking gain for the prior time step, the gain transitions from the fast tracking gain to the fast recovery gain for the current time step if: $\Delta<\beta$ AND $\dot{u}<\omega$; wherein $\Delta$ is the delta, $\beta$ is a beta threshold for the delta, $\dot{u}$ is the rate of change of the demanded position input, and $\omega$ is a threshold for the rate of change of the demanded position input.

8. The method of claim 1, wherein the actuating component is moveable between an open position and a closed position, and wherein the method further comprises:
   setting an initial gain, wherein the initial gain is a filter off state, and wherein during determining the gain, when the actuating component is moved to a more open position, the gain remains in the filter off state.

9. The method of claim 1, wherein the gain is determined based at least in part on both of the rate of change of the demanded position input and the size or the sign of the delta.

10. The method of claim 1, wherein determining the gain comprises looking up a gain value in a lookup table.

11. The method of claim 1, wherein determining the gain comprises:
scheduling the gain based at least in part on the rate of change of the demanded position input.

12. A turbine engine, comprising:
an actuating component;
an actuator for actuating the actuating component;
a controller comprising an adaptive damping lag filter, the adaptive damping lag filter of the controller configured to:
obtain a demanded position input of the actuating component for a current time step;
determine a derivative of the demanded position input;
obtain a delta, wherein the delta is representative of a demanded position output of a prior time step subtracted from the demanded position input for the current time step;
determine a gain based at least in part on a size or a sign of the delta, wherein the gain is determined as one of a plurality of gains that include a slow gain, a fast tracking gain, and a fast recovery gain for avoiding stall conditions associated with the turbine engine; and
output a demanded position output for the current time step to the actuator based at least part on the gain.

13. The turbine engine of claim 12, wherein the actuator defines a stroke, and wherein the demanded position input is input into the adaptive damping lag filter as a percentage of the stroke, the derivative of the demanded position input is a percentage of the stroke over time, and the demanded position output is output from the adaptive damping lag filter as another percentage of the stroke;
determining a gain based at least in part on a size or a sign of the delta, wherein the gain is selectable between at least three gains, including a slow gain, a fast tracking gain, and a fast recovery gain; and
outputting a demanded position output for the current time step based at least part on the gain.

14. The turbine engine of claim 12, wherein the adaptive damping lag filter of the controller is further configured to:
set or obtain an initial gain.

15. The turbine engine of claim 14, wherein the initial gain is a filter off state of the adaptive damping lag filter, and wherein the adaptive damping lag filter of the controller is further configured to:
determine whether the delta is less than zero (0), and wherein if the delta is less than zero (0), then the adaptive damping lag filter transitions the gain to a filter on state.

16. The turbine engine of claim 14, wherein the actuating component comprises a valve door, and wherein the initial gain is a filter on state of the adaptive damping lag filter, and wherein the adaptive damping lag filter of the controller is further configured to:
determine whether the delta is greater than or equal to zero (0), and wherein if the delta is greater than or equal to zero (0), then the adaptive damping lag filter transitions the gain to a filter off state as the actuating component is demanding that the valve door be moved to a more open position if the delta is greater than or equal to zero (0).

17. A method for controlling an actuating component of a gas turbine engine, the method comprising:
obtaining a demanded position input of the actuating component for a current time step;
determining a derivative of the demanded position input;
obtaining a delta, wherein the delta is representative of a demanded position output of a prior time step subtracted from the demanded position input for the current time step;
determining a gain based at least in part on a size or a sign of the delta, wherein the gain is selectable between at least three gains, including a slow gain, a fast tracking gain, and a fast recovery gain; and
outputting a demanded position output for the current time step based at least part on the gain.

18. The method of claim 17, wherein the actuating component is moveable between an open position and a closed position, and wherein during determining the gain, the gain is determined to be in either a filter off state or a filter on state, wherein when the gain is determined to be in the filter on state, the gain is one of the slow gain, the fast tracking gain, and the fast recovery gain, wherein the fast recovery gain moves the actuating component to a more open position faster than the slow gain and the fast tracking gain and the fast tracking gain moves the actuating component to the more open position faster than the slow gain.

\* \* \* \* \*